United States Patent
Bruns et al.

(10) Patent No.: US 11,989,415 B2
(45) Date of Patent: May 21, 2024

(54) ENABLING OR DISABLING DATA REDUCTION BASED ON MEASURE OF DATA OVERWRITES

(71) Applicant: HEWLETT PACKARD ENTERPRISE DEVELOPMENT LP, Houston, TX (US)

(72) Inventors: Samuel Lee Bruns, Ft. Collins, CO (US); Marcel Furtado Almeida, Boise, ID (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 60 days.

(21) Appl. No.: 17/818,805

(22) Filed: Aug. 10, 2022

(65) Prior Publication Data
US 2024/0053889 A1   Feb. 15, 2024

(51) Int. Cl.
*G06F 3/06* (2006.01)

(52) U.S. Cl.
CPC .............. *G06F 3/061* (2013.01); *G06F 3/064* (2013.01); *G06F 3/0641* (2013.01); *G06F 3/0653* (2013.01); *G06F 3/067* (2013.01); *G06F 3/0671* (2013.01)

(58) Field of Classification Search
None
See application file for complete search history.

(56) References Cited

U.S. PATENT DOCUMENTS

| | | | |
|---|---|---|---|
| 7,567,188 B1 | 7/2009 | Anglin et al. | |
| 9,122,639 B2 | 9/2015 | Kennedy et al. | |
| 9,330,156 B2 | 5/2016 | Satapathy | |
| 9,785,666 B2 | 10/2017 | Li et al. | |
| 9,977,746 B2 | 5/2018 | Muppalaneni et al. | |
| 10,572,171 B2 | 2/2020 | Takaoka et al. | |
| 10,664,165 B1 | 5/2020 | Faibish et al. | |
| 11,010,078 B2 | 5/2021 | Sharma et al. | |
| 11,113,245 B2 | 9/2021 | Constantinescu et al. | |
| 11,301,427 B2 | 4/2022 | McIlroy et al. | |
| 2014/0114932 A1* | 4/2014 | Mallaiah | G06F 3/0641 707/E17.032 |
| 2014/0365449 A1* | 12/2014 | Chambliss | G06F 3/0641 707/692 |
| 2015/0288680 A1* | 10/2015 | Leggette | G06F 21/6218 726/6 |
| 2015/0373119 A1* | 12/2015 | Kaneko | G06F 9/5027 709/219 |
| 2017/0220629 A1 | 8/2017 | Tal et al. | |
| 2017/0351602 A1* | 12/2017 | Oshimi | G11C 16/3418 |
| 2021/0200567 A1 | 7/2021 | Tsirkin et al. | |

* cited by examiner

*Primary Examiner* — Nathan Sadler
(74) *Attorney, Agent, or Firm* — Trop, Pruner & Hu, P.C.

(57) ABSTRACT

In some examples, a system computes a measure of data overwrites to a data segment stored in a storage structure, where the measure of data overwrites indicates a quantity of overwrites of data in the data segment. The system compares the measure of data overwrites to a criterion. In response to determining that the measure of data overwrites has a first relationship with respect to the criterion, the system disables data reduction for the data segment.

20 Claims, 4 Drawing Sheets

ENABLING OR DISABLING DATA REDUCTION BASED ON MEASURE OF DATA OVERWRITES

BACKGROUND

A storage system includes resources to allow the storage system to store data in a storage medium, which can include a collection of storage devices (a single storage device or multiple storage devices). In some examples, a storage system can include the storage medium and other resources, including processing resources and communication resources. In other examples, a storage system can be in the form of a control system (e.g., a storage server) including processing resources and communication resources and that manages storage of data on separate storage media.

BRIEF DESCRIPTION OF THE DRAWINGS

Some implementations of the present disclosure are described with respect to the following figures.

Figure 1:
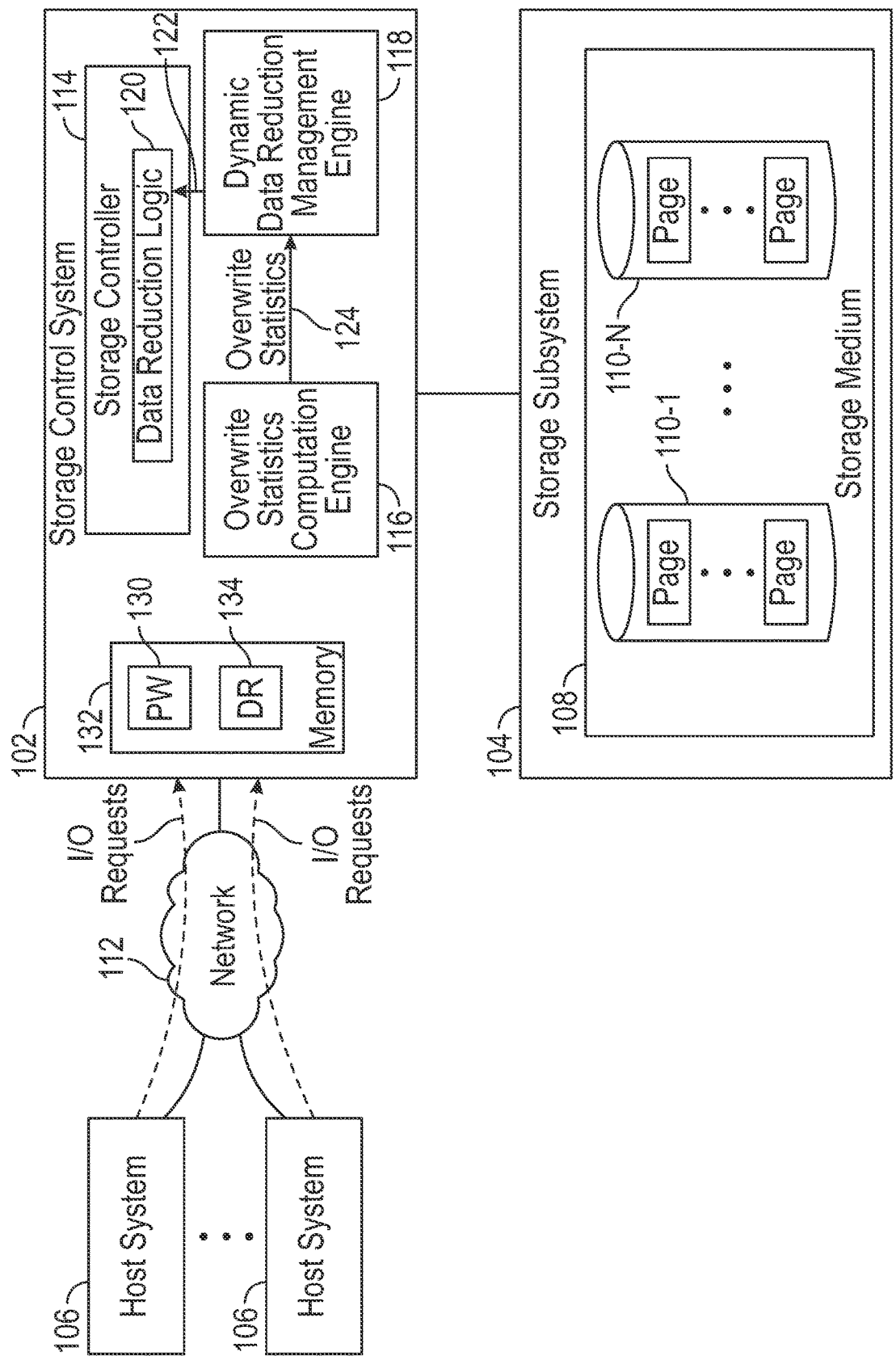
FIG. 1 is a block diagram of an arrangement that includes a dynamic data reduction management engine according to some examples, for managing selective enabling or disabling of data reduction for storage volumes.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Data reduction may be applied by some workloads performed on storage volumes stored by a storage system. A "storage volume" (or equivalently a "virtual volume") can refer to a logical container or other construct into which data can be added, such as by write operations. Data can also be retrieved from a storage volume in read operations.

Examples of data reduction that can be performed on data can include data compression and/or data deduplication. Data compression can refer to encoding or otherwise transforming data such that the data is potentially reduced in size, i.e., the compressed data has a size that is potentially smaller than the size of the uncompressed data. Examples of the compression techniques include Lempel-Ziv (LZ) compression, run-length encoding, dictionary coding, and so forth.

Data deduplication refers to removing duplicate data portions that appear in data. For example, input data may be divided into data chunks. A deduplication process can identify data chunks that have been previously stored by a storage system—the identified data chunks are duplicative data chunks since the storage system already stores the data chunks. The deduplication process may avoid storing the identified duplicative data chunks again at the storage system. Instead of storing the duplicative data chunks, the deduplication process can instead store references to the previously stored data chunks. The deduplicated data (e.g., a deduplicated file, a deduplicated object, etc.) can contain a collection of data chunks and references, where the references are to stored data chunks and are produced by the deduplication process. A "reference" can be a pointer or any other indication of a storage location to a data chunk.

More generally, data reduction applied on data refers to any process that reduces the amount of data stored in a storage system, in response to received input data ("raw data") to store in the storage system. The reduced data produced by the data reduction can have a smaller size than the input data prior to the data reduction.

Performing data reduction can be resource intensive. For example, data reduction can consume processing resources (e.g., processors, cores of processors, etc.). Data compression applies data encoding that may take some amount of time to execute, especially if the input data is large. Data deduplication can involve dividing input data into data chunks, calculating signature values (e.g., hash values) based on the data chunks, comparing the signature values to a collection of signature values representing data chunks already stored by a storage system, and identifying data chunks for the input data with signature values that match the collection of signature values as duplicative data chunks.

In addition to processing resources, other types of resources that may be consumed when performing data reduction can include any or some combination of: input/output (I/O) resources (e.g., resources such as an I/O controller that support I/O operations, such read operations and write operations), communication resources (e.g., network interface controllers, switches or routers, etc.), memory resources (e.g., memory devices such as dynamic random access memory. (DRAM) devices, static random access memory (SRAM) devices, flash memory devices, etc.), and so forth.

Resources that can be consumed when performing data reduction may also include logical resources, such as virtual machines, virtual processors, virtual communication devices, and so forth, and/or program resources, such as device drivers, operating system (OS) resources, and so forth.

In accordance with some implementations of the present disclosure, selective enabling and disabling of data reduction is applied on a data segment (e.g., a storage volume, a data page, or any other unit of data at a specified granularity) based on computing an overwrite measure that is based on a quantity of overwrites of data in the data segment.

FIG. 1 is a block diagram of an example arrangement that includes a storage control system 102 and a storage subsystem 104. The storage control system 102 can be implemented with a collection of computers (a single computer or multiple computers).

The storage control system 102 manages the access of data stored in the storage subsystem 104, such as in response to input/output (I/O) requests from host systems 106.

In some examples, the storage control system 102 and the storage subsystem 104 can be integrated into a storage system, such as a storage array. In such examples, the storage control system 102 and the storage subsystem 104 can be part of the same physical enclosure. In other examples, the storage control system 102 and the storage subsystem 104 can be physically separate from one another; for example, the storage subsystem 104 may be connected by a link to the storage control system 102, where the link can include a cable, a network, a wireless connection, and so forth.

The storage subsystem 104 includes a storage medium 108, which can be implemented using a collection of storage devices (a single storage device or multiple storage devices). Examples of storage devices can include any or some combination of the following: a disk-based storage device, a solid-state drive, and so forth.

Storage volumes 110-1 to 110-N (N≥1) can be stored in the storage medium 108. Each storage volume includes a collection of pages (a single page or multiple pages). A "page" can refer to any portion of a storage volume, where the portion can have a size that is smaller than the overall size of the storage volume or can have the same size as the storage volume. Pages in a storage volume can be identified using respective page identifiers, such as page numbers or any other types of identifiers that can be used to distinguish between different pages of a storage volume.

A storage volume can be identified using a storage volume identifier, such as a logical unit number (LUN) or any other type of storage volume identifier that can distinguish between different storage volumes.

A "host system" can refer to any computing system that is able to submit I/O requests to the storage control system 102, such as over a network 112. Examples of host systems can include any or some combination of the following: a desktop computer, a notebook computer, a tablet computer, a smartphone, a server computer, a vehicle, a household appliance, a game appliance, or any of the type of electronic device.

The network 112 may include a storage area network (SAN), a local area network (LAN), a wide area network (LAN), a public network such as the Internet, and so forth. The network 112 may be a wired network and/or a wireless network.

I/O requests can include write requests to write data to the storage subsystem 104, and/or read requests to read data from the storage subsystem 104.

The storage control system 102 includes a storage controller 114 that manages access of the storage subsystem 104 in response to I/O requests received from the host systems 106. The storage controller 114 can receive an I/O request, and in response, the storage controller 114 can issue commands to the storage subsystem 104 to perform I/O operations requested by the I/O request, such as a write operation or a read operation.

In accordance with some implementations of the present disclosure, the storage control system 102 also includes an overwrite statistics computation engine 116 and a dynamic data reduction management engine 118.

As used here, an "engine" or a "controller" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" or a "controller" can refer to a combination of one or more hardware processing circuits and machine-readable instructions (software and/or firmware) executable on the one or more hardware processing circuits.

Although FIG. 1 depicts the overwrite statistics computation engine 116 and the dynamic data reduction management engine 118 as being separate from the storage controller 114, in other examples, the overwrite statistics computation engine 116 and/or the dynamic data reduction management engine 118 can be part of the storage controller 114.

Additionally, in further examples, the overwrite statistics computation engine 116 and the dynamic data reduction management engine 118 can be integrated into a single engine, or alternatively, the functionalities of the overwrite statistics computation engine 116 and the dynamic data reduction management engine 118 can be divided into more than two engines.

The storage controller 114 further includes data reduction logic 120 that can apply data reduction (data compression and/or data deduplication) on data, if enabled. The data reduction logic 120 can be implemented using a portion of the hardware processing circuit(s) of the storage controller 114, or alternatively, can be implemented using machine-readable instructions executable by the storage controller 114.

In some examples, the dynamic data reduction management engine 118 provides dynamic control indications 122 to the data reduction logic 120 to dynamically enable or disable data reduction on a per-storage volume basis. In other words, the dynamic data reduction management engine 118 can selectively enable or disable application of data reduction for each individual storage volume in the storage subsystem 104.

In other examples, instead of selectively enabling or disabling data reduction on a per-storage volume basis, the dynamic data reduction management engine 118 can dynamically enable or disable the application of data reduction at a different granularity, such as for individual pages (where data reduction can be selectively applied for each page of a storage volume), or for a data unit at a different granularity.

More generally, the dynamic data reduction management engine 118 is able to dynamically enable or disable the application of data reduction for each individual data segment (storage volume, page, or other unit of data).

The dynamic control indications 122 can take various forms. For example, the dynamic control indications 122 can be in the form of indicators such as flags, where each indicator is associated with a respective storage volume. A first indicator is associated with a first storage volume, a second indicator is associated with a second storage volume, and so forth. Each indicator can be set to a first value (e.g., 0) to indicate that data reduction is disabled for the respective storage volume, and set to a different second value (e.g., 1) to indicate that data reduction is enabled for the respective storage volume.

In other examples, the dynamic control indications 122 can be in the form of "policies," including a data reduction enabled policy that specifies that data reduction is enabled for a respective storage volume, and data reduction disabled policy that specifies that data reduction is disabled for the respective storage volume. For example, the data reduction enabled policy can include information elements indicating that data compression and/or data deduplication is enabled, while the data reduction disabled policy can include information elements indicating that data compression and data deduplication are disabled.

In some examples, the overwrite statistics computation engine 116 computes overwrite statistics for pages of the storage volumes 110-1 to 110-N. As write requests are processed by the storage controller 114, the overwrite statistics computation engine 116 can determine whether or not each write request causes an overwrite of data in a corresponding page. A data overwrite occurs if the write data of the write request updates the corresponding page that was previously written to. Note that inserting new data into a page that was not previously written to is not considered an overwrite.

In some examples, the overwrite statistics computation engine 116 can maintain a page write tracking structure 130 (e.g., a bitmap or other data structure) for each storage volume that includes page write tracking indicators to track which pages of the storage volume have been previously written to. In some examples, the page write tracking structure 130 can be stored in a memory 132 of the storage control system 102. A memory can be implemented with a collection of memory devices (a single memory device or multiple memory devices). Examples of memory devices include any or some combination of a dynamic random access memory (DRAM) device, a static random access memory (SRAM) device, a flash memory device, and so forth.

A page write tracking indicator if set to a first value (e.g., set to 0) indicates that the respective page has not been written to. On the other hand, the page write tracking indicator if set to a different second value (e.g., set to 1) indicates that the respective page was previously written to. If a write request causes a write to a given page associated with a page write tracking indicator set to the first value, then the write to the given page inserts new data into the given page that is not considered a data overwrite. If a write request causes a write to the given page associated with a page write tracking indicator set to the second value, then the write to the given page overwrites data of the given page.

The overwrite statistics computation engine 116 provides overwrite statistics 124 to the dynamic data reduction management engine 118. An overwrite statistic in some examples can include a measure of data overwrites that indicates a quantity of overwrites of data in a page. For example, the measure of data overwrites can indicate a quantity of overwrites of data in the page in a given time window. During the given time window, the overwrite statistics computation engine 116 counts the quantity of overwrites of data to each page. Note that the quantity of overwrites counted by the overwrite statistics computation engine 116 can be 0 or greater than 0.

For each given page, new measures of data overwrites are computed in successive time windows. For example, for each given page, a first measure of data overwrites is computed for a first time window, a second measure of data overwrites is computed for a second time window following the first time window, and so forth. At the start of each successive time window, the measure of data overwrites is reset and re-computed based on monitoring the quantity of overwrites of data in the given page during the successive time window.

In some examples, the overwrite statistics 124 provided by the overwrite statistics computation engine 116 to the dynamic data reduction management engine 118 can include the per-page measures of data overwrites. In some examples, the per-page measures of data overwrites can include metadata identifying a storage volume that the pages (for which the per-page measures of data overwrites were computed) are part of.

In other examples, instead of sending per-page measures of data overwrites, the overwrite statistics computation engine 116 can instead send storage volume overwrite measures to the dynamic data reduction management engine 118, where each storage volume overwrite measure indicates a quantity of overwrites of the pages of a respective storage volume.

In examples where per-page measures of data overwrites are sent by the overwrite statistics computation engine 116 to the dynamic data reduction management engine 118, the dynamic data reduction management engine 118 collects the per-page measures of data overwrites for each individual storage volume, and computes a mathematical aggregate (e.g., a sum, an average, a median, a maximum, etc.) of the measures of data overwrites of the pages in the individual storage volume.

For example, if a given storage volume includes multiple pages 1 to M (M≥2), then the per-page measures of data overwrites in the overwrite statistics 124 can include page overwrite measure OM2 for page 2, and page overwrite measure OM5 for page 5. The other pages of the given storage volume may not have been overwritten, so it is assumed that the page overwrite measure for each such other page is 0 (and in some cases would not be sent by the overwrite statistics computation engine 116 to the dynamic data reduction management engine 118). The dynamic data reduction management engine 118 applies a mathematical aggregate of the page overwrite measures, which produces a storage volume overwrite measure for the given storage volume. Based on the storage volume overwrite measure for the given storage volume, the dynamic data reduction management engine 118 can decide whether or not to enable or disable data reduction for the given storage volume.

The dynamic data reduction management engine 118 can aggregate per-page measures of data overwrites for pages of each of the storage volumes 110-1 to 110-N, and can independently determine whether or not to apply data reduction to each corresponding storage volume based upon the respective storage volume overwrite measures.

In other examples, instead of providing per-page measures of data overwrites to the dynamic data reduction management engine 118, the overwrite statistics computation engine 116 can perform the mathematical aggregate of the per-page measures of data overwrites for each storage volume. In such examples, each storage volume overwrite measure computed based on the per-page measures of data overwrites of pages of a respective storage volume is provided in the overwrite statistics 124 from the overwrite statistics computation engine 116 to the dynamic data reduction management engine 118.

Figure 2:
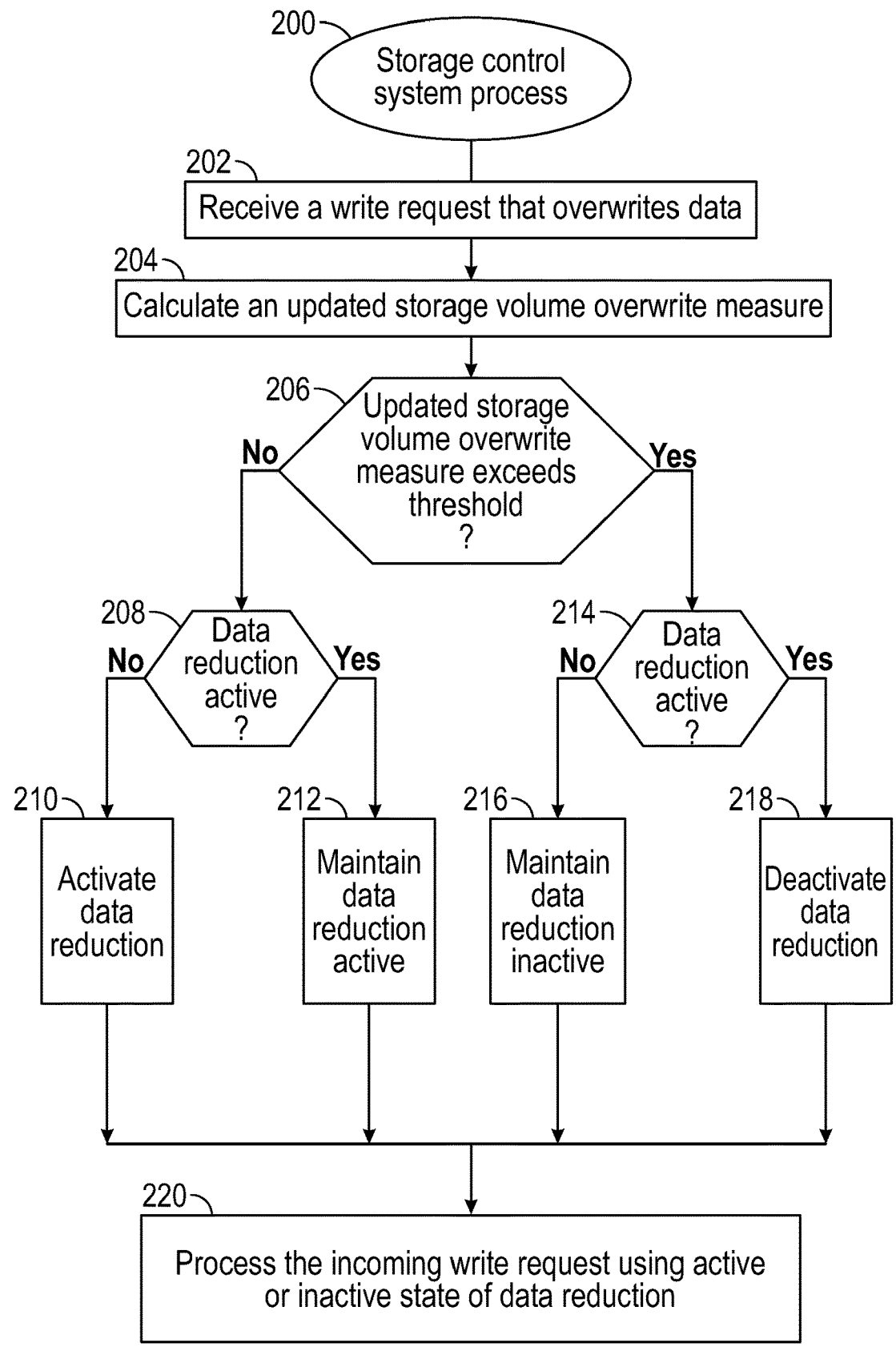
FIG. 2 is a flow diagram of a process of dynamically enabling or disabling data reduction for storage volumes, according to some examples.

FIG. 2 is a flow diagram of the process 200 performed by the storage control system 102 according to some examples. The storage control system 102 receives (at 202) an incoming write request that overwrites data in a page of a given storage volume (e.g., one of 110-1 to 110-N).

In response to the incoming write request that overwrites data, the overwrite statistics computation engine 116 or the dynamic data reduction management engine 118 calculates (at 204) an updated storage volume overwrite measure for the given storage volume. The updated storage volume overwrite measure is based on measures of data overwrites collected for pages of the given storage volume. In a simple example, it is assumed that the storage volume overwrite measure is based on a sum of the measures of data overwrites for the pages of the given storage volume. The incoming write request would cause another overwrite to a page of the given storage volume, which would result in a current value of the storage volume overwrite measure being incremented, such as by 1, to produce the updated storage volume overwrite measure.

The dynamic data reduction management each engine 118 determines (at 206) whether the updated storage volume overwrite measure exceeds a specified threshold. The specified threshold can be a static threshold configured in the storage control system 102, such as with a configuration parameter. In other examples, the specified threshold can be dynamically varied by the storage control system 102.

If the updated storage volume overwrite measure does not exceed the specified threshold (the "No" branch from 206), then the dynamic data reduction management engine 118 determines (at 208) whether data reduction is active for the given storage volume. For example, the dynamic data reduction management engine 118 can maintain a data reduction tracking structure 134 (FIG. 1) that tracks whether or not data reduction is active for each storage volume. For example, the data reduction tracking structure 134 can be in the form of a bitmap or other data structure, and can include data reduction tracking indicators for respective storage volumes. A data reduction tracking indicator if set to a first value (e.g., 0) indicates that data reduction is disabled for the respective storage volume, and the data reduction tracking indicator if set to a different second value (e.g., 1) indicates that data reduction is enabled for the respective storage volume. The data reduction tracking structure 134 can be stored in the memory 132, for example.

In other examples, the dynamic data reduction management engine 118 can store (e.g., in the memory 132) the data reduction policy for each storage volume.

If the dynamic data reduction management engine 118 determines (at 208) that data reduction is not active for the given storage volume (e.g., the corresponding data reduction tracking indicator for the given storage volume in the data reduction tracking structure 134 has the first value, e.g., 0), then the dynamic data reduction management engine 118 activates (at 210) the data reduction for the given storage volume. The activation can include sending a dynamic control indication 122 (FIG. 1) from the dynamic data reduction management engine 118 to the data reduction logic 120 in the storage controller 114 that indicates to the data reduction logic 120 that data reduction is to be enabled for the given storage volume. The activation can also include setting the corresponding data reduction tracking indicator for the given storage volume in the data reduction tracking structure 134 to the second value (e.g., 1).

If the dynamic data reduction management engine 118 determines (at 208) that data reduction is already active for the given storage volume (e.g., the corresponding data reduction tracking indicator for the given storage volume in the data reduction tracking structure 134 has the second value, e.g., 1), the dynamic data reduction management engine 118 maintains (at 212) the active data reduction for the given storage volume. In this case, the dynamic data reduction management engine 118 does not have to send a dynamic control indication 122 to the data reduction logic 120 in the storage controller 114 since data reduction is already enabled.

If the dynamic data reduction management engine 118 determines (at 206) that the storage volume overwrite measure exceeds the specified threshold (the "Yes" branch from 206), then the dynamic data reduction management engine determines (at 214) whether data reduction is active for the given storage volume. If the data reduction for the given storage volume is active, the dynamic data reduction management engine 118 deactivates (at 218) data reduction for the given storage volume. The deactivation can include sending a dynamic control indication 122 (FIG. 1) from the dynamic data reduction management engine 118 to the data reduction logic 120 in the storage controller 114 that indicates to the data reduction logic 120 that data reduction is to be disabled for the given storage volume. The deactivation can also include resetting the corresponding data reduction tracking indicator for the given storage volume in the data reduction tracking structure 134 to the first value (e.g., 0).

On the other hand, if the dynamic data reduction management engine 118 determines (at 214) that data reduction for the given storage volume is not active, the dynamic data reduction management engine 118 maintains (at 216) the inactive state of data reduction for the given storage volume. In this case, the dynamic data reduction management engine 118 does not have to send a dynamic control indication 122 to the data reduction logic 120 in the storage controller 114 since data reduction is already disabled.

The data reduction logic 120 of the storage controller 114 can process (at 220) the incoming write request using the active or inactive state of data reduction set by the dynamic data reduction management engine 118.

FIG. 2 shows an example in which the determination of whether data reduction is to be enabled or disabled is performed for each incoming write request that overwrites data. In other examples, instead of performing the determination for each incoming write request, the determination of whether data reduction is enabled or disabled can be performed for every P (P>1) write requests that overwrite data. In other words, once data reduction for a given storage volume is enabled or disabled by the dynamic data reduction management engine 118, the enabled or disabled data reduction is applied for the next P write requests that overwrite data to the given storage volume, following which the dynamic determination of data reduction enabling or disabling is performed again.

In FIG. 2, tasks 208, 210, and 212 enable data reduction for the given storage volume in response to the updated storage volume overwrite measure not exceeding the specified threshold, and tasks 214, 216, and 218 disable data reduction for the given storage volume in response to the updated storage volume overwrite measure exceeding the specified threshold.

In other examples, tasks 208, 210, and 212 enable data reduction for the given storage volume in response to the updated storage volume overwrite measure not exceeding a first threshold, and tasks 214, 216, and 218 disable data reduction for the given storage volume in response to the updated storage volume overwrite measure exceeding a second threshold that is greater than the first threshold. This provides hysteresis to avoid a ping-pong effect of quickly enabling and disabling data reduction for a storage volume for successive write requests. In such examples, the data reduction state (enabled or disabled) for the given storage volume is not changed if the updated storage volume overwrite measure is between the first threshold and the second threshold.

By disabling data reduction for a data volume if a relatively large quantity of data overwrites to the data volume is observed, more effective consumption of resources (such as of the storage control system 102) can be achieved. Performing data reduction when there is a relatively large quantity of data overwrites may be inefficient. If there are a large quantity of data overwrites, the data reduction work performed for pages that are overwritten would be wasted since the data reduction would have to be performed again for the new write data that overwrites the previous data.

Figure 3:
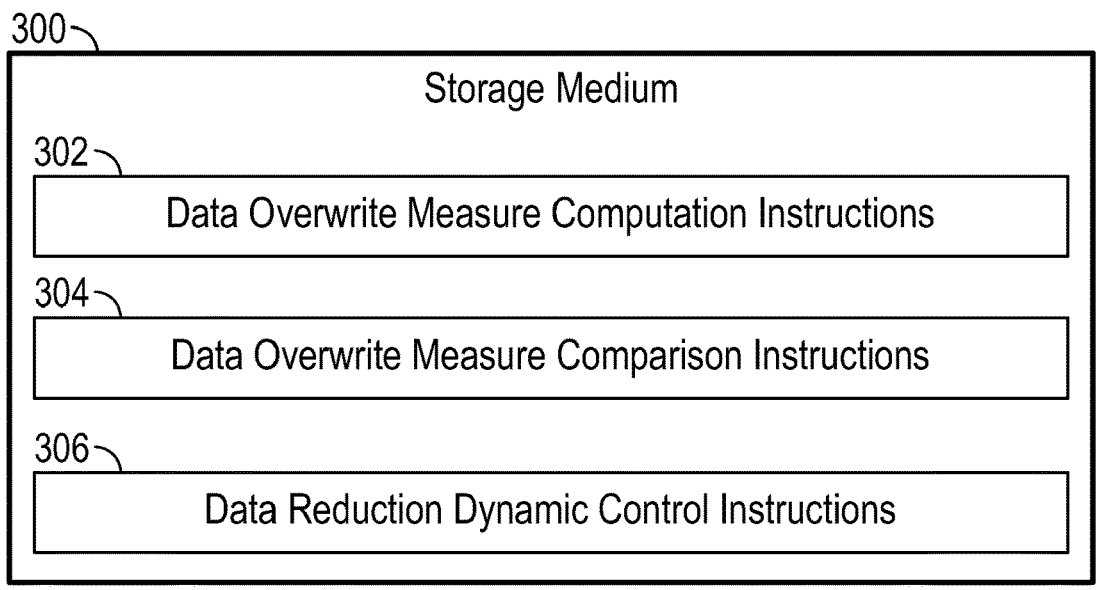
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system (e.g., the storage control system 102 of FIG. 1) to perform various tasks.

The machine-readable instructions include data overwrite measure computation instructions 302 to compute a measure of data overwrites to a data segment stored in a storage structure, where the measure of data overwrites indicates a quantity of overwrites of data in the data segment. In some examples, the storage structure includes a physical storage medium, such as the storage medium 108 of FIG. 1. In other examples, the storage structure includes a virtual storage system.

In some examples, the data segment includes a storage volume (e.g., any of 110-1 to 110-N in FIG. 1). In other examples, the data segment is a different unit of data, e.g., a page, etc.

The machine-readable instructions include data overwrite measure comparison instructions 304 to compare the measure of data overwrites to a criterion. For example, the data overwrite measure comparison instructions 304 can compare the measure of data overwrites to a threshold.

The machine-readable instructions include data reduction dynamic control instructions 306 to, in response to determining that the measure of data overwrites has a first relationship with respect to the criterion (e.g., the measure is greater than a threshold), disable data reduction for the data segment.

In some examples, the measure of data overwrites is based on the quantity of overwrites of data in the data segment in a specified time window.

In some examples, the data segment includes a plurality of sub-segments. For example, the data segment can be a storage volume, and the sub-segments can be pages of the storage volume. The machine-readable instructions can obtain measures of data overwrites of respective individual sub-segments of the plurality of sub-segments, where the computing of the measure of data overwrites is based on the measures of data overwrites of the respective individual sub-segments.

In some examples, the computing of the measure of data overwrites is based on computing a mathematical aggregate of the measures of data overwrites of the respective individual sub-segments.

In some examples, in response to determining that the measure of data overwrites has a different second relationship with respect to the criterion, the machine-readable instructions enable data reduction for the data segment In some examples, the disabling of data reduction for the data segment includes setting a first policy for the data segment, the first policy specifying that data reduction is not to be applied to data written to the data segment. The first policy can be set by the dynamic data reduction management engine 118 sending a dynamic control indication 122 to the data reduction logic 120 in the storage controller 114 indicating that data reduction is to be enabled for the data segment, for example.

In some examples, the setting of the first policy for the data segment includes maintaining the first policy for the data segment if the first policy is already associated with the data segment, or changing from a second policy to the first policy for the data segment if the second policy was associated with the data segment, the second policy specifying that data reduction is to be applied to data written to the data segment.

In some examples, in response to determining that the measure of data overwrites has a different second relationship with respect to the criterion, the machine-readable instructions set the second policy for the data segment.

In some examples, the machine-readable instructions manage whether data reduction is to be applied to incoming write data according to which of the first policy or the second policy is set for the data segment.

Figure 4:
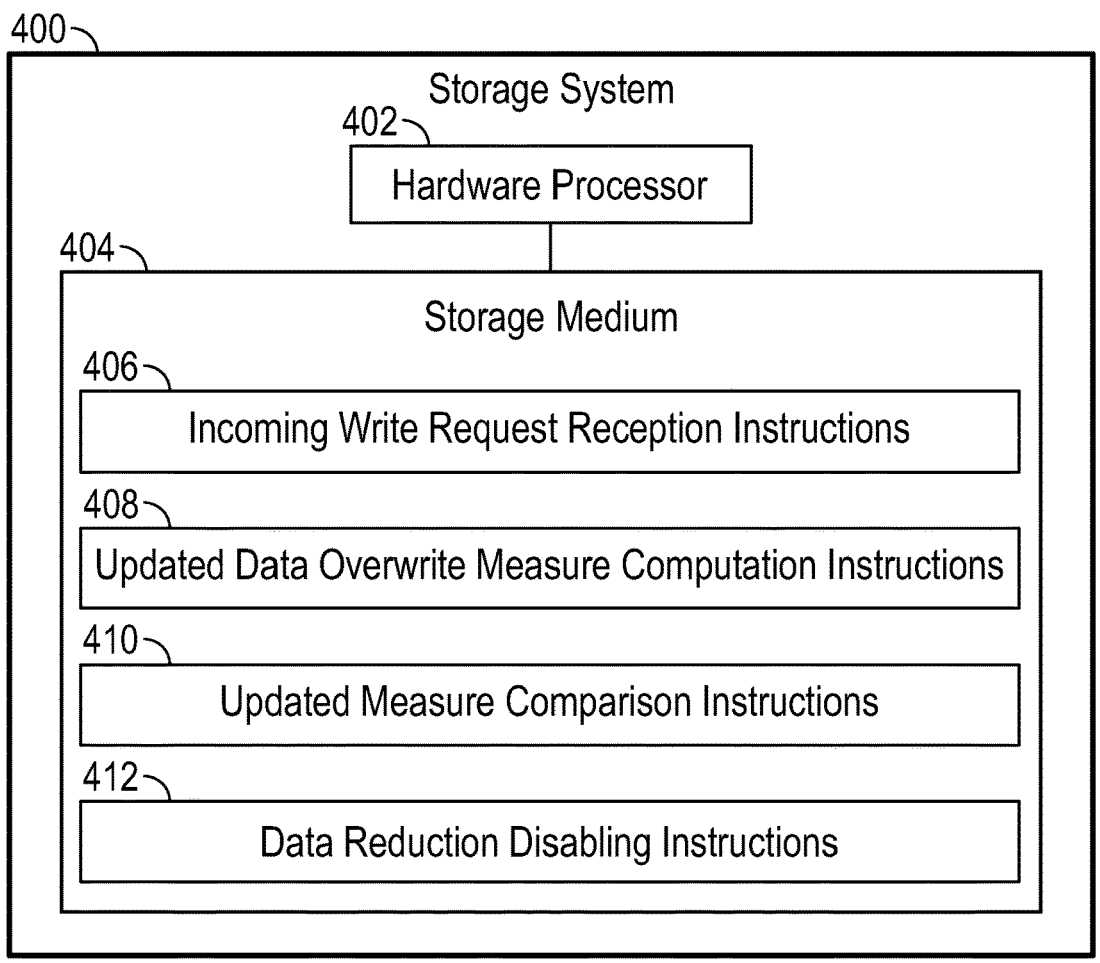
FIG. 4 is a block diagram of a storage system according to some examples.

FIG. 4 is a block diagram of a storage system 400 according to some examples. The storage system 400 can include the storage control system 102 of FIG. 1, for example, or can include the combination of the storage control system 102 and the storage subsystem 104 of FIG. 1, as another example.

The storage system 400 includes a hardware processor 402 (or multiple hardware processors). A hardware processor can include a microprocessor, a core of a multi-core microprocessor, a microcontroller, a programmable integrated circuit, a programmable gate array, or another hardware processing circuit.

The storage system 400 further includes a non-transitory storage medium 404 storing machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions in the storage medium 404 include incoming write request reception instructions 406 to receive an incoming write request that overwrites data in a data segment stored in a storage structure.

The machine-readable instructions in the storage medium 404 include updated data overwrite measure computation instructions 408 to, in response to the incoming write request, compute an updated measure of data overwrites to the data segment, where the updated measure of data overwrites indicates a quantity of overwrites of data in the data segment.

The machine-readable instructions in the storage medium 404 include updated measure comparison instructions 410 to compare the updated measure of data overwrites to a criterion.

The machine-readable instructions in the storage medium 404 include data reduction disabling instructions 412 to, in response to determining that the updated measure of data overwrites has a first relationship with respect to the criterion, disable data reduction for the data segment.

In some examples, in response to determining that the updated measure of data overwrites has a different second relationship with respect to the criterion, the machine-readable instructions enable data reduction for the data segment.

In some examples, the updated measure of data overwrites has the first relationship with respect to the criterion if the updated measure of data overwrites exceeds a first threshold, and the updated measure of data overwrites has the different second relationship with respect to the criterion if the updated measure of data overwrites does not exceed a second threshold.

In some examples, the first threshold is the same as the second threshold.

In some examples, the second threshold is less than the first threshold.

Figure 5:
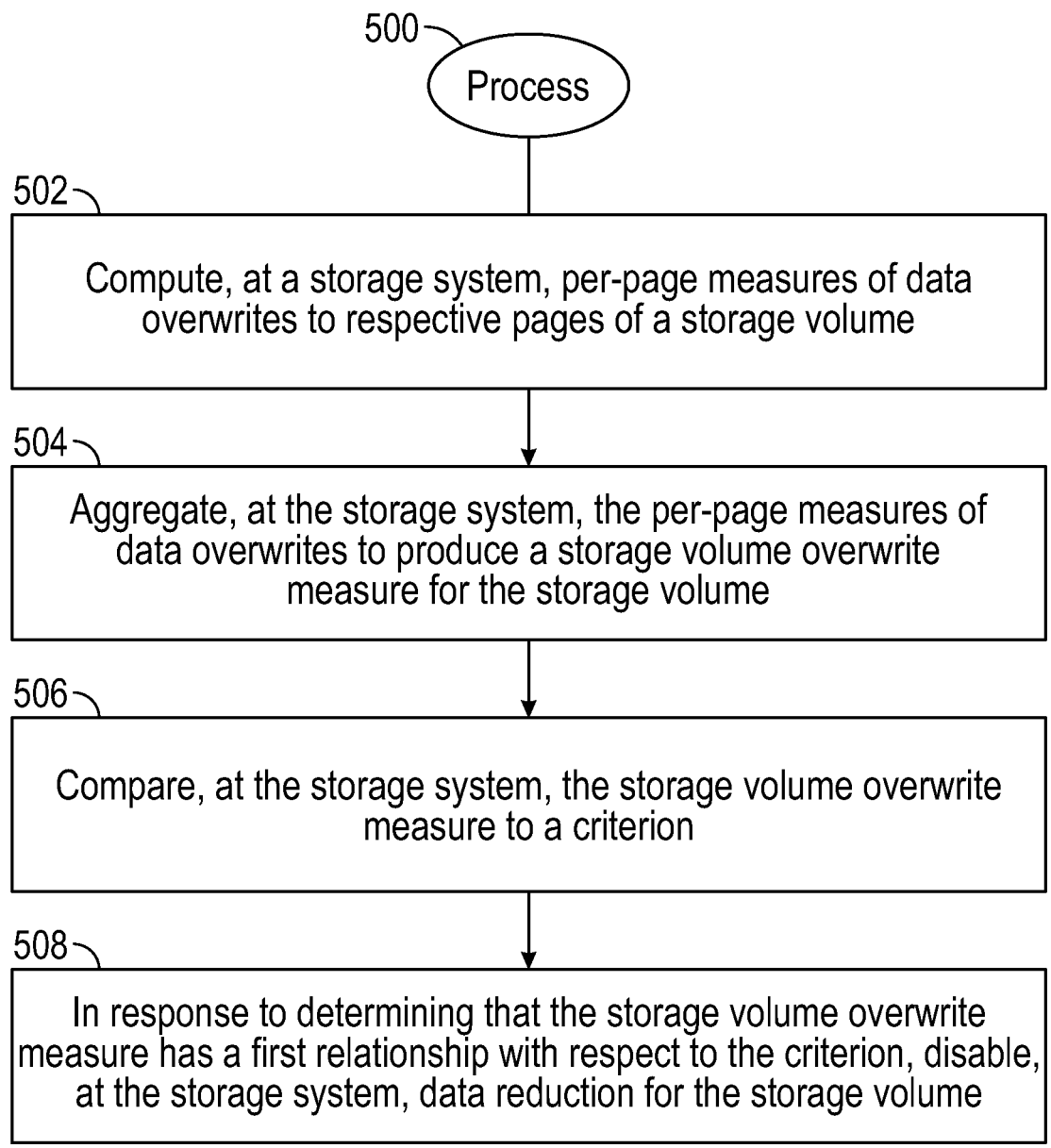
FIG. 5 is a flow diagram of a process according to some examples.

FIG. 5 is a flow diagram of a process 500 according to some examples. The process 500 may be performed by the storage control system 102 of FIG. 1, for example.

The process 500 includes computing (at 502), at a storage system, per-page measures of data overwrites to respective pages of a storage volume. For example, the per-page measures of data overwrites can be computed by the overwrite statistics computation engine 116 of FIG. 1.

The process 500 includes aggregating (at 504), at the storage system, the per-page measures of data overwrites to produce a storage volume overwrite measure for the storage volume. For example, the aggregating can be performed by the overwrite statistics computation engine 116 or the dynamic data reduction management engine 118 of FIG. 1.

The process 500 includes comparing (at 506), at the storage system, the storage volume overwrite measure to a criterion. For example, the storage volume overwrite measure can be compared to a threshold.

The process 500 includes, in response to determining that the storage volume overwrite measure has a first relationship with respect to the criterion, disabling (at 508), at the storage system, data reduction for the storage volume.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
compute a measure of data overwrites to a data segment stored in a storage structure, wherein the measure of data overwrites indicates a quantity of overwrites of data in the data segment, wherein the data segment comprises a plurality of sub-segments, and the computing of the measure of data overwrites to the data segment comprises:
counting quantities of overwrites of data to respective individual sub-segments of the plurality of sub-segments, the counting producing measures of data overwrites to the respective individual sub-segments, and
computing a mathematical aggregate of the measures of data overwrites to the respective individual sub-segments to generate the measure of data overwrites to the data segment;
compare the measure of data overwrites to a criterion; and
in response to determining that the measure of data overwrites has a first relationship with respect to the criterion, disable data reduction for the data segment.

2. The non-transitory machine-readable storage medium of claim 1, wherein the measures of data overwrites to the respective individual sub-segments is based on the quantities of overwrites of data to the respective individual sub-segments in a first time window.

3. The non-transitory machine-readable storage medium of claim 2, wherein the instructions upon execution cause the system to:
for a second time window after the first time window:
reset the measures of data overwrites to the respective individual sub-segments,
count, for the second time window, quantities of overwrites of data to the respective individual sub-segments, the counting for the second time window producing measures of data overwrites to the respective individual sub-segments for the second time window,
compute a mathematical aggregate of the measures of data overwrites to the respective individual sub-segments for the second time window to generate a measure of data overwrites to the data segment in the second time window, and
compare the measure of data overwrites in the second time window to the criterion.

4. The non-transitory machine-readable storage medium of claim 1, wherein the computing of the mathematical aggregate comprises computing a sum or an average of the measures of data overwrites to the respective individual sub-segments to generate the measure of data overwrites to the data segment.

5. The non-transitory machine-readable storage medium of claim 1, wherein the data segment comprises a storage volume, and the plurality of sub-segments comprises a plurality of pages in the storage volume.

6. The non-transitory machine-readable storage medium of claim 1, wherein the instructions upon execution cause the system to:
in response to determining that the measure of data overwrites has a different second relationship with respect to the criterion, enable data reduction for the data segment.

7. The non-transitory machine-readable storage medium of claim 1, wherein the disabling of data reduction for the data segment comprises setting a first policy for the data segment, the first policy specifying that data reduction is not to be applied to data written to the data segment.

8. The non-transitory machine-readable storage medium of claim 7, wherein the setting of the first policy for the data segment comprises:
maintaining the first policy for the data segment if the first policy is already associated with the data segment, or
changing from a second policy to the first policy for the data segment if the second policy was associated with the data segment, the second policy specifying that data reduction is to be applied to data written to the data segment.

9. The non-transitory machine-readable storage medium of claim 8, wherein the instructions upon execution cause the system to:
in response to determining that the measure of data overwrites has a different second relationship with respect to the criterion, set the second policy for the data segment.

10. The non-transitory machine-readable storage medium of claim 9, wherein the system comprises a storage system, and the first policy or the second policy is set for the data segment at the storage system.

11. The non-transitory machine-readable storage medium of claim 9, wherein the instructions upon execution cause the system to:
    manage whether data reduction is to be applied to incoming write data according to which of the first policy or the second policy is set for the data segment.

12. The non-transitory machine-readable storage medium of claim 1, wherein the computing of the measure of data overwrites, the comparing of the measure of data overwrites to the criterion, and the disabling of data reduction are performed in response to receiving a request to write data to the data segment.

13. A storage system comprising:
    a processor; and
    a non-transitory storage medium storing instructions executable on the processor to:
        receive an incoming write request that overwrites data in a data segment stored in a storage structure;
        in response to the incoming write request, compute an updated measure of data overwrites to the data segment, wherein the updated measure of data overwrites indicates a quantity of overwrites of data in the data segment, wherein the data segment comprises a plurality of sub-segments, and the computing of the updated measure of data overwrites to the data segment comprises:
            counting quantities of overwrites of data to respective individual sub-segments of the plurality of sub-segments, the counting producing measures of data overwrites to the respective individual sub-segments, and
            computing a mathematical aggregate of the measures of data overwrites to the respective individual sub-segments to generate the updated measure of data overwrites to the data segment;
        compare the updated measure of data overwrites to a criterion; and
        in response to determining that the updated measure of data overwrites has a first relationship with respect to the criterion, disable data reduction for the data segment.

14. The storage system of claim 13, wherein the instructions are executable on the processor to:
    in response to determining that the updated measure of data overwrites has a different second relationship with respect to the criterion, enable data reduction for the data segment.

15. The storage system of claim 14, wherein the updated measure of data overwrites has the first relationship with respect to the criterion if the updated measure of data overwrites exceeds a first threshold, and the updated measure of data overwrites has the different second relationship with respect to the criterion if the updated measure of data overwrites does not exceed a second threshold.

16. The storage system of claim 15, wherein the first threshold is the same as the second threshold.

17. The storage system of claim 15, wherein the second threshold is less than the first threshold.

18. The storage system of claim 13, wherein the measures of data overwrites to the respective individual sub-segments is based on the quantities of overwrites of data to the respective individual sub-segments in a first time window, and wherein the instructions are executable on the processor to:
    for a second time window after the first time window:
        reset the measures of data overwrites to the respective individual sub-segments,
        count, for the second time window, quantities of overwrites of data to the respective individual sub-segments, the counting for the second time window producing measures of data overwrites to the respective individual sub-segments for the second time window,
        compute a mathematical aggregate of the measures of data overwrites to the respective individual sub-segments for the second time window to generate a measure of data overwrites to the data segment in the second time window, and
        compare the measure of data overwrites in the second time window to the criterion.

19. A method comprising:
    counting, at a storage system, quantities of overwrites of data to respective individual pages of a plurality of pages that are part of a storage volume, the counting producing per-page measures of data overwrites to the respective individual pages of the storage volume;
    computing, at the storage system, a mathematical aggregate of the per-page measures of data overwrites to produce a storage volume overwrite measure for the storage volume;
    comparing, at the storage system, the storage volume overwrite measure to a criterion; and
    based on determining that the storage volume overwrite measure has a first relationship with respect to the criterion, disabling, at the storage system, data reduction for the storage volume.

20. The method of claim 19, comprising:
    based on determining that the storage volume overwrite measure has a different second relationship with respect to the criterion, enabling, at the storage system, data reduction for the storage volume.

* * * * *